US010984609B2

(12) United States Patent
Han et al.

(10) Patent No.: US 10,984,609 B2
(45) Date of Patent: Apr. 20, 2021

(54) APPARATUS AND METHOD FOR GENERATING 3D AVATAR

(71) Applicant: Electronics and Telecommunications Research Institute, Daejeon (KR)

(72) Inventors: Byung-Ok Han, Daejeon (KR); Ho-Won Kim, Seoul (KR); Ki-Nam Kim, Daejeon (KR); Jae-Hwan Kim, Daejeon (KR); Ji-Hyung Lee, Daejeon (KR); Yu-Gu Jung, Daejeon (KR); Chang-Joon Park, Daejeon (KR); Gil-Haeng Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/563,517

(22) Filed: Sep. 6, 2019

(65) Prior Publication Data

US 2020/0160613 A1 May 21, 2020

(30) Foreign Application Priority Data

Nov. 21, 2018 (KR) ........................ 10-2018-0144533
Mar. 20, 2019 (KR) ........................ 10-2019-0031994

(51) Int. Cl.
*G06T 19/20* (2011.01)
*G06K 9/00* (2006.01)
*G06T 13/40* (2011.01)

(52) U.S. Cl.
CPC .......... *G06T 19/20* (2013.01); *G06K 9/00369* (2013.01); *G06T 13/40* (2013.01)

(58) Field of Classification Search
CPC ..... G06T 19/20; G06T 13/40; G06K 9/00369; G06K 9/00362; G06K 9/6211; G06K 9/00208
See application file for complete search history.

(56) References Cited

U.S. PATENT DOCUMENTS 8,830,269 B2 9/2014 Lim et al.
9,949,697 B2 4/2018 Iscoe et al.
2008/0158224 A1 7/2008 Wong et al.
2011/0148864 A1 6/2011 Lee et al.
2015/0213646 A1* 7/2015 Ma ........................... G06T 7/50 345/420
2016/0093085 A1* 3/2016 Ray ........................... G06T 7/60 345/419
2016/0199147 A1 7/2016 Shin

FOREIGN PATENT DOCUMENTS

KR 1020110070056 A 6/2011
KR 101072944 B1 10/2011
KR 1020120121036 A 11/2012

* cited by examiner

*Primary Examiner* — Said Broome
(74) *Attorney, Agent, or Firm* — William Park & Associates Ltd.

(57) ABSTRACT

Disclosed herein are an apparatus and method for generating a 3D avatar. The method, performed by the apparatus, includes performing a 3D scan of the body of a user using an image sensor and generating a 3D scan model using the result of the 3D scan of the body of the user, matching the 3D scan model and a previously stored template avatar, and generating a 3D avatar based on the result of matching the 3D scan model and the template avatar.

14 Claims, 10 Drawing Sheets

APPARATUS AND METHOD FOR GENERATING 3D AVATAR

CROSS REFERENCE TO RELATED APPLICATIONS

This application claims the benefit of Korean Patent Application No. 10-2018-0144533, filed Nov. 21, 2018, and No. 10-2019-0031994, filed Mar. 20, 2019, which are hereby incorporated by reference in their entirety into this application.

BACKGROUND OF THE INVENTION

1. Technical Field

The present invention relates generally to computer graphics and computer vision technology, and more particularly to technology for 3D scanning and 3D information modeling based on computer vision.

2. Description of the Related Art

Recently, 3D scanning techniques using consumer-grade depth sensors, such as Microsoft's Kinect and the like, RGB camera sensors installed in mobile phones, and the like have come into wide use. Particularly, 3D body-scanning technology enables body shape information to be reconstructed based on distance information, which is not included in a 2D image, and enables actual measurements to be acquired from the body shape information. Therefore, the 3D body-scanning technology is core technology for implementing augmented reality, in which a virtual human body is created in real space. Such information reconstructed in 3D may be applied to clothing recommendation and virtual fitting, in which user's body shape information is reflected, and exercise recommendations that suit individual body shapes may be provided based on the 3D body shape information. 3D body-scanning technology is thus expected to become more widely used.

However, unlike the acquisition of image information, it is not easy to acquire 3D body shape information of a user. In order to acquire accurate and complete 3D scan information, it is necessary for a user to continuously check intermediate scan results and to perform 360-degree scanning of the target to be reconstructed such that the scan results contain no holes and no cracks. That is, in order to perform 360-degree scanning, the user who performs scanning must use a turn table or must scan every part of the target by circling 360 degrees around the target and checking the intermediate results. This impedes general users from acquiring 3D body shape information. Also, holes or cracks in a 3D scan result, which are caused due to the limitations of a consumer-grade depth sensor, may cause a 3D surface mesh to be defective. Accordingly, it is necessary to manually modify the 3D scan result after 3D scanning.

Meanwhile, Korean Patent Application Publication No. 10-2011-0070056, titled "Method and apparatus for generating high-quality 3D avatar customized for user", discloses a method and apparatus for generating a high-quality 3D avatar customized for a user, which are configured to construct a database by acquiring high-quality data pertaining to many people, to establish an avatar production process for fast processing, to acquire a minimum amount of data pertaining to a user in order to generate a 3D avatar for the user, and to modify and use the acquired data, thereby quickly generating an avatar resembling the user while maintaining high quality.

SUMMARY OF THE INVENTION

An object of the present invention is to generate a 3D avatar in which the body shape of a user is reflected by securing the integrity and accuracy of the 3D body shape information of the user.

Another object of the present invention is to generate an animatable 3D avatar in which the body shape of a user is reflected in spite of incompleteness of a 3D scan model.

A further object of the present invention is to consistently measure body shape information even when the pose of the body of a user is changed.

In order to accomplish the above objects, a method for generating a 3D avatar, performed by an apparatus for generating the 3D avatar, according to an embodiment of the present invention includes performing a 3D scan of a body of a user using an image sensor and generating a 3D scan model using the result of the 3D scan of the body of the user; matching the 3D scan model and a previously stored template avatar; and generating a 3D avatar based on the result of matching the 3D scan model and the template avatar.

Here, matching the 3D scan model and the previously stored template avatar may be configured to match the 3D scan model and the template avatar using point-to-point correspondence between the 3D scan model and the template avatar.

Here, matching the 3D scan model and the previously stored template avatar may be configured to apply 6-degrees-of-freedom rigid transformation for calibrating the approximate translations, orientations and scales of the 3D scan model and the template avatar.

Here, the point-to-point correspondence may include information in which one or more positions predefined in the body parts of the 3D scan model and the template avatar are defined as corresponding points.

Here, the one or more positions predefined in the body parts may include at least one of the position of a face, the positions of hands, and the positions of feet.

Here, matching the 3D scan model and the previously stored template avatar may be configured to define the corresponding points of the 3D scan model and the corresponding points of the template avatar as pairs of corresponding points based on the one or more positions predefined in the body parts.

Here, matching the 3D scan model and the previously stored template avatar may be configured to apply rigid transformation to the template avatar by moving and rotating the 3D scan model based on the positions of the corresponding points of the template avatar and the positions of the corresponding points of the 3D scan model using the point-to-point correspondence.

Here, matching the 3D scan model and the previously stored template avatar may be configured to change the pose of the template avatar using the point-to-point correspondence and the skeleton information of the template avatar such that the pose of the template avatar matches the pose of the 3D scan model.

Here, matching the 3D scan model and the previously stored template avatar may be configured to register the template avatar to the 3D scan model in such a way that, in order to minimize the differences between the positions of the corresponding points of the template avatar and those of the 3D scan model, minimum distances from the corresponding points of the template avatar, the pose of which is changed using the skeleton information, to the corresponding points of the 3D scan model are calculated, and the pose of the template avatar is changed based on the minimum distances between the corresponding points and a minimum distance from each of the vertices of the template avatar to the 3D scan model.

Here, matching the 3D scan model and the previously stored template avatar may be configured to calculate a minimum distance between the surface of the template avatar and the surface of the 3D scan model by adjusting the position of each of the vertices of the template avatar using an affine transformation matrix.

Also, in order to accomplish the above objects, an apparatus for generating a 3D avatar according to an embodiment of the present invention includes one or more processors; memory; and one or more programs. The one or more programs may be stored in the memory and executed by the one or more processors, and the one or more processors may be configured to perform a 3D scan of a body of a user using an image sensor and generate a 3D scan model using the result of the 3D scan of the body of the user, to match the 3D scan model and a previously stored template avatar, and to generate a 3D avatar based on the result of matching the 3D scan model and the template avatar by executing the one or more programs.

Here, the one or more processors may match the 3D scan model and the template avatar using point-to-point correspondence between the 3D scan model and the template avatar.

Here, the one or more processors may apply 6-degrees-of-freedom rigid transformation for calibrating the approximate translations, orientations and scales of the 3D scan model and the template avatar.

Here, the point-to-point correspondence may include information in which one or more positions predefined in the body parts of the 3D scan model and the template avatar are defined as corresponding points.

Here, the one or more positions predefined in the body parts may include at least one of the position of a face, the positions of hands, and the positions of feet.

Here, the one or more processors may define the corresponding points of the 3D scan model and the corresponding points of the template avatar as pairs of corresponding points based on the one or more positions predefined in the body parts.

Here, the one or more processors may apply rigid transformation to the template avatar by moving and rotating the 3D scan model based on the positions of the corresponding points of the template avatar and the positions of the corresponding points of the 3D scan model using the point-to-point correspondence.

Here, the one or more processors may change the pose of the template avatar using the point-to-point correspondence and the skeleton information of the template avatar such that the pose of the template avatar matches the pose of the 3D scan model.

Here, the one or more processors may register the template avatar to the 3D scan model in such a way that, in order to minimize the differences between the positions of the corresponding points of the template avatar and those of the 3D scan model, minimum distances from the corresponding points of the template avatar, the pose of which is changed using the skeleton information, to the corresponding points of the 3D scan model are calculated, and the pose of the template avatar is changed based on the minimum distances between the corresponding points and a minimum distance from each of the vertices of the template avatar to the 3D scan model.

Here, the one or more processors may calculate a minimum distance between the surface of the template avatar and the surface of the 3D scan model by adjusting the position of each of the vertices of the template avatar using an affine transformation matrix.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
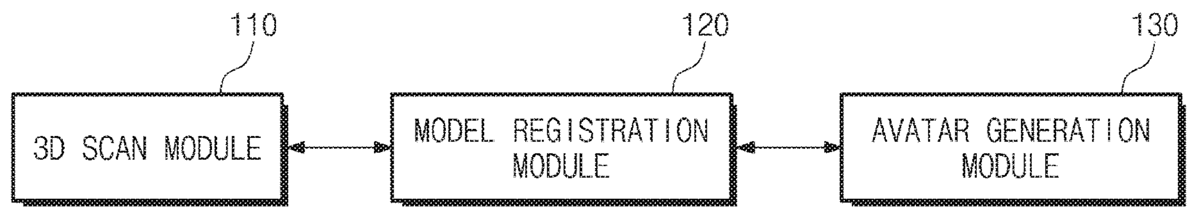
FIG. 1 is a block diagram that shows an apparatus for generating a 3D avatar according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms “comprises” and/or “comprising” and “includes” and/or “including” specify the presence of stated elements but do not preclude the presence or addition of one or more other elements unless otherwise specified.

Hereinafter, a preferred embodiment of the present invention will be described in detail with reference to the accompanying drawings.

Figure 2:
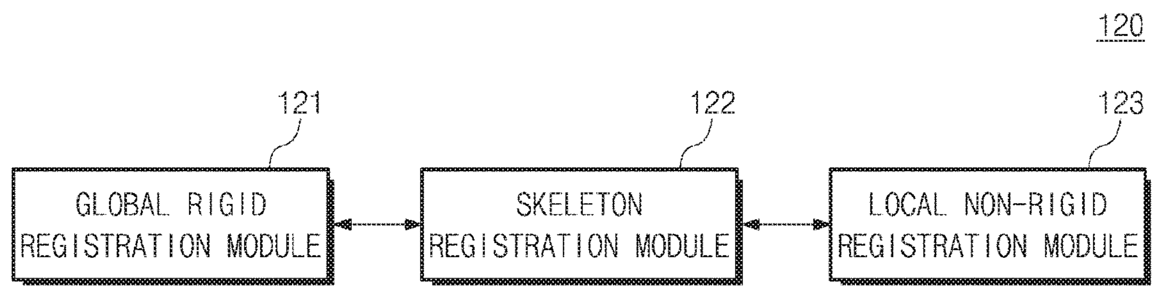
FIG. 2 is a block diagram that specifically shows an example of the model registration module illustrated in FIG. 1.

FIG. 1 is a block diagram that shows an apparatus for generating a 3D avatar according to an embodiment of the present invention. FIG. 2 is a block diagram that specifically shows an example of the model registration module illustrated in FIG. 1.

Referring to FIG. 1, the apparatus for generating a 3D avatar according to an embodiment of the present invention may include a 3D scan module 110, a model registration module 120, and an avatar generation module 130.

The 3D scan module 110 may perform a 3D scan of the body of a user using an image sensor and generate a 3D scan model using the result of the 3D scan of the body of the user.

Here, the image sensor may be a depth sensor or an RGB sensor.

Here, the 3D scan module 110 may perform the 3D scan of the body of the user using a depth image or an RGB image.

Here, the 3D scan module 110 may perform the 3D scan using only a depth image, only an RGB image, or a combination thereof.

The generated 3D scan model of the user may be the result of a scan of part of the body or the result of a 360-degree scan of the full body. Here, the 3D scan model may include a hole or a crack due to limitations of the sensor or an algorithm.

The model registration module 120 may match the 3D scan model with a previously stored template avatar.

Here, the template avatar may be a standard avatar model that represents a human body. Here, the template avatar may include skeleton information and vertex weight information.

Here, when the template avatar does not include skeleton information or vertex weight information, the model registration module 120 may update the template avatar so as to include skeleton information and vertex weight information using an automatic rigging algorithm.

Here, the model registration module 120 may match the 3D scan model and the template avatar using point-to-point correspondence between the 3D scan model and the template avatar.

Here, the model registration module 120 may apply 6-degrees-of-freedom (6DoF) rigid transformation for adjusting the approximate translation, orientation, and scale of the 3D scan model and the template avatar.

Here, the point-to-point correspondence may include information in which one or more positions predefined in the body parts of the 3D scan model and the template avatar are defined as corresponding points.

Here, the one or more positions predefined in the body parts may include at least one of the position of a face, the positions of hands, and the positions of feet.

Here, the model registration module 120 may define the corresponding points of the 3D scan model and the corresponding points of the template avatar as pairs of corresponding points based on the one or more positions predefined in the body parts.

Here, the model registration module 120 may recognize the pose of the 3D scan model and automatically find the corresponding points of the 3D scan model using an algorithm.

Here, the model registration module 120 may perform at least one of global rigid registration, skeleton-based human pose registration, and local non-rigid registration.

Referring to FIG. 2, the model registration module 120 may include a global rigid registration module 121, a skeleton registration module 122, and a local non-rigid registration module 123.

Because the model registration module 120 is able to transform the template avatar through partial registration even when the 3D scan model of a user is incomplete or even when part of the 3D scan model is missing due to limitations of the sensor or the algorithm, a 3D avatar in which the body shape of the user is reflected may be generated.

Here, for the 3D scan model, a part of which is missing, the model registration module 120 may first register the front side of the body through partial registration and then register the template avatar, of which the front side is transformed through partial registration, to the 3D scan model, in which case the back side of the template avatar may not be transformed because information pertaining thereto is missing. Additionally, the model registration module 120 may transform the back side of the template avatar.

Here, the model registration module 120 gradually transforms the template avatar through partial registration, thereby improving the accuracy and completeness of a 3D avatar in which the body shape of a user is reflected.

The global rigid registration module 121 may register the 3D scan model to the template avatar by moving and rotating the 3D scan model based on the positions of the corresponding points of the template avatar and the positions of the corresponding points of the 3D scan model using the point-to-point correspondence.

Here, the global rigid registration module 121 may perform approximate registration by acquiring the 6DoF translation and rotation information of the template avatar and the scale information thereof based on the 3D scan model using the point-to-point correspondence.

The skeleton registration module 122 may change the pose of the template avatar using the point-to-point correspondence and the skeleton information of the template avatar such that the pose of the template avatar matches that of the 3D scan model.

In order to represent a slight change in the skeletal structure of a 3D avatar, it is necessary to reflect a slight change in the translation and rotation of each segment of the skeleton. Also, when multiple partial scans of the same person are performed, because the pose of the person may change over time, a registration method that is adaptable to a change in the pose is required.

For example, when the template avatar, transformed based on a first 3D scan model, which is generated by scanning the front of a user, is transformed again using a second 3D scan model, which is generated by scanning the side of the user, if the pose of the first 3D scan model differs from that of the second 3D scan model, the skeleton registration module 122 changes the pose of the template avatar using the skeleton information thereof, thereby registering the template avatar to the 3D scan model.

The template avatar may include the correlation between each predefined bone and each predefined vertex.

That is, because rigging is applied to the template avatar, a change in the pose of bones may cause a change in the pose of the template avatar.

Here, the rigging method used for the template avatar may be linear blend skinning, which is most commonly used. The rigging method is configured to define a weight, which is the influence of each bone on each vertex, and to assign a translation component, corresponding to the weight, to each vertex based on the movement of the bone, and may be represented as shown in Equation (1):

$$V_i = \sum_{j=0}^{N_b} w_j T_j v_j^0 \tag{1}$$

In Equation (1), $V_i$ denotes the position of one vertex of the template avatar, $N_b$ denotes the number of bones of a skeleton model, $w_j$ denotes the weight of a bone, $T_j$ denotes the rigid transformation matrix of the j-th bone, and $v_j^0$ denotes the local coordinates of the vertex with respect to the j-th bone when the template avatar takes a reference pose.

Here, the skeleton registration module 122 may optimize the joint angle between bones and the coordinates of joints in order to match the pose of the template avatar with the pose of the 3D scan model of the user.

Here, the skeleton registration module 122 may perform an operation for finding the rigid transformation matrix of a joint, through which the sum of the values of the three error functions shown in Equation (2) may be minimized.

$$E=\alpha E_f+\beta E_d+\gamma E_s \tag{2}$$

In Equation (2), $E_f$ denotes an error function pertaining to the distance between corresponding points, and $\alpha$ denotes a weight therefor. $E_d$ denotes an error function for minimizing the distance between the template avatar and the 3D scan model of the user, and $\beta$ denotes a weight therefor. $E_s$ denotes a function for minimizing the sum of the rotation angles of joints, and $\gamma$ denotes a weight therefor.

The error function $E_d$ for minimizing the distance between the skeleton of the template avatar and the 3D scan model of the user may be defined as shown in Equation (3):

$$E_d=\sum_{i=1}^{N_m} dist^2(\text{skin}(V_i), D) \tag{3}$$

In Equation (3), dist( ) denotes a function for calculating the minimum distance between skin($V_i$), which is the vertex transformed using the rigid transformation matrix of the relevant joint, and D, which is the surface of the 3D scan model of the user, and $N_m$ denotes the number of vertices of the template avatar.

Here, the corresponding points of the 3D scan model, which are input from the user, may converge to local minima. In order to prevent this, the error function $E_f$ pertaining to the distance between the corresponding point of the template avatar and that of the 3D scan model of the user may be defined as shown in Equation (4):

$$E_f=\sum_{i=1}^{N_f} \|\text{skin}(F_{M_i})-F_{D_i}\|^2 \tag{4}$$

In Equation (4), $F_M$ and $F_D$ denote user-defined corresponding points of the template avatar M and the 3D scan model D. The function may be calculated so as to minimize the distance between $F_D$ and skin($F_M$), which is the point acquired by transforming $F_M$ using the rigid transformation matrix of the joint. Here, N denotes the number of user-defined corresponding points.

Also, the error function for maintaining the shape of the template avatar M may be defined using the quaternion, which corresponds to the rotation of the joint angle, as shown in Equation (5):

$$E_s=\sum_{i=0}^{N_b} \|q_i\|^2 \tag{5}$$

In Equation (5), $N_b$ denotes the number of bones, $q_i$ denotes the rotation of the joint i, and $E_s$ denotes an objective function for minimizing the sum of the rotation angles of the joints.

That is, in order to minimize the differences between the positions of the corresponding points of the template avatar and those of the 3D scan model, the skeleton registration module 122 calculates the minimum distances from the corresponding points of the template avatar, the pose of which is changed using the skeleton information, to the corresponding points of the 3D scan model and changes the pose of the template avatar based on the minimum distances between the corresponding points and the minimum distance from each of the vertices of the template avatar to the 3D scan model, thereby registering the template avatar to the 3D scan model.

The local non-rigid registration module 123 adjusts the position of each of the vertices of the template avatar using an affine transformation matrix for each vertex, thereby calculating the minimum distance between the surface of the template avatar and the surface of the 3D scan model.

Here, the local non-rigid registration module 123 adjusts the position of each of the vertices of the template avatar M using an affine transformation matrix, thereby minimizing the distance from the 3D scan model D of the user.

Here, the local non-rigid registration module 123 may define an error function as shown in Equation (6):

$$E=\alpha E_f+\beta E_d+\gamma E_s \tag{6}$$

In Equation (6), $E_f$ denotes an error function pertaining to the distance between corresponding points, and $\alpha$ denotes a weight therefor. $E_d$ denotes an error function for minimizing the distance between the template avatar and the 3D scan model of the user, and $\beta$ denotes a weight therefor. $E_s$ denotes a requirement for maintaining the basic shape of the template avatar.

Here, the local non-rigid registration module 123 may define the error function $E_d$ for minimizing the distance between the template avatar M and D, which is the surface of the 3D scan model of the user, as shown in Equation (7):

$$E_d=\sum_{i=1}^{N_m} dist^2(T_i, V_i, D) \tag{7}$$

In Equation (7), dist( ) denotes a function for calculating the minimum distance between the point acquired by transforming a vertex $V_i$ of the template avatar using the affine transformation matrix $T_i$, and D, which is the surface of the 3D scan model of the user, and $N_m$ denotes the number of vertices of the template avatar. Here, the distance may be calculated by measuring the shortest distance from a triangular mesh.

Here, the local non-rigid registration module 123 may define the error function pertaining to the distance between the corresponding points, which are input by a user, as shown in Equation (8):

$$E_f=\sum_{i=1}^{N_f} \|T_i F_{M_i}-F_{D_i}\|^2 \tag{8}$$

In Equation (8), $F_M$ and $F_D$ denote the user-defined corresponding points of the template avatar M and the 3D scan model D of the user. Here, the operation may be performed such that the distance between $F_D$ and the point acquired by transforming $F_M$ using the affine transformation matrix $T_i$ is minimized. Here, $N_f$ denotes the number of user-defined corresponding points.

Finally, the local non-rigid registration module 123 may define an error function for minimizing the difference between the transformation matrices of all edges as a requirement for maintaining the shape of the template avatar M.

If the two vertices of any edge $e_i$ are similarly transformed, the difference between the transformation matrices of the two vertices converges to a zero matrix. Using this, Equation (9) may defined as shown below:

$$E_s = \sum_{i,j|v_i,v_j \in edges(M)}^{N_s} \|T_i - T_j\|^2 \quad (9)$$

Here, the transformation matrices of the two vertices of an arbitrary edge are represented as $T_i$ and $T_j$, and $N_s$ denotes the number of edges of the template avatar M. The model registration module 120 may separately use the global rigid registration module, the skeleton-based pose registration module, and the local non-rigid registration module, or may use two or more thereof together according to an embodiment.

For example, when the translation, rotation, and scale of the template avatar are already adjusted to match the 3D scan model, the model registration module 120 may match the template avatar and the 3D scan model by performing only skeleton-based pose registration and local non-rigid registration, without performing global rigid registration.

Also, when the pose of the 3D scan model is the same as the pose of the template avatar, the model registration module 120 may perform only local non-rigid registration without performing skeleton-based pose registration.

Also, the model registration module 120 may perform only the registration function selected by the user according to an embodiment.

The avatar generation module 130 may generate a 3D avatar based on the result of matching the 3D scan model and the template avatar.

Here, the 3D avatar may be a refined and animatable avatar in which rigging information and vertex weight information are incorporated by reflecting the body shape of the user.

Here, the avatar generation module 130 may provide a user with an exercise prescription in the form of an animation using the generated 3D avatar, or the generated 3D avatar may be used as the character of the user in a game or the like.

Here, the 3D avatar may be used to provide information about the body shape of the user using the 3D surface information and the skeleton information thereof. For example, circumference information, such as a head circumference, a chest measurement, or the like, may be calculated using a plane that is defined with a point, corresponding to a position defined in the skeleton information of the 3D avatar, and with a normal vector defined with the orientation of the skeleton. Also, the ratio of the length of an arm to the length of a leg, the ratio of a chest measurement to a hip circumference, and the like may be calculated from the skeleton information, and the volume of the user avatar may be determined using the vertex information. Here, the body shape information of the 3D avatar may be automatically calculated based on the skeleton information of the 3D avatar, whereby consistent body shape information of each user may be maintained. Also, the body shape information of the 3D avatar may be used for tracking changes in the body shape of the user over time.

Here, even when a part of the body is not registered because a 3D scan model is a partial model, the avatar generation module 130 may generate a 3D avatar by gradually reflecting the body shape of a user.

Here, even when a full 3D scan is impossible, the avatar generation module 130 may generate an avatar in which a part of the body shape of a user is reflected based on the result of the partial scan of the body.

Here, because an avatar can be further transformed based on the result of an additional scan of the body, the avatar generation module 130 may gradually improve the degree to which the body shape of the user is reflected.

Here, the avatar generation module 130 may generate an animatable avatar based on a refined mesh.

Here, the avatar generation module 130 may generate an animatable 3D avatar in which the body shape of a user is reflected in spite of an incomplete 3D scan of the body.

Here, the avatar generation module 130 may overcome the incompleteness of the 3D scan result, which is caused due to the noise of a consumer-grade depth sensor or an RGB sensor, holes, or limitations of a 3D scan algorithm, thereby generating a 3D avatar.

Here, in spite of the incompleteness of the 3D scan result, the avatar generation module 130 may generate a 3D avatar in which the body shape of a user is reflected such that the 3D avatar based on a refined 3D mesh is capable of motion through animation.

Here, using the avatar in which the 3D body shape of the user is reflected, the avatar generation module 130 may automatically measure the volume of the body, the ratio between the body parts, and the circumferences of the body parts from the consistent body shape based on the skeleton.

Here, the avatar generation module 130 may measure the volume of the body of a user using the surface mesh information of the generated 3D avatar of the user.

Here, the avatar generation module 130 may measure body proportions using the skeleton information of the generated 3D avatar and the bounding box of the surface of the generated 3D avatar.

Here, the avatar generation module 130 may automatically measure the circumferences of body parts using information about the position of the skeleton of the generated 3D avatar and the surface information thereof.

Also, the apparatus for generating a 3D avatar according to an embodiment of the present invention includes one or more processors, memory, and one or more programs. Here, the one or more programs are stored in the memory and executed by the one or more processors. The one or more processors may execute the one or more programs.

Here, the one or more processors may include the 3D scan module 110, the model registration module 120 and the avatar generation module 130, and may perform the functions of the 3D scan module 110, the model registration module 120, and the avatar generation module 130 using the one or more programs.

Figure 3:
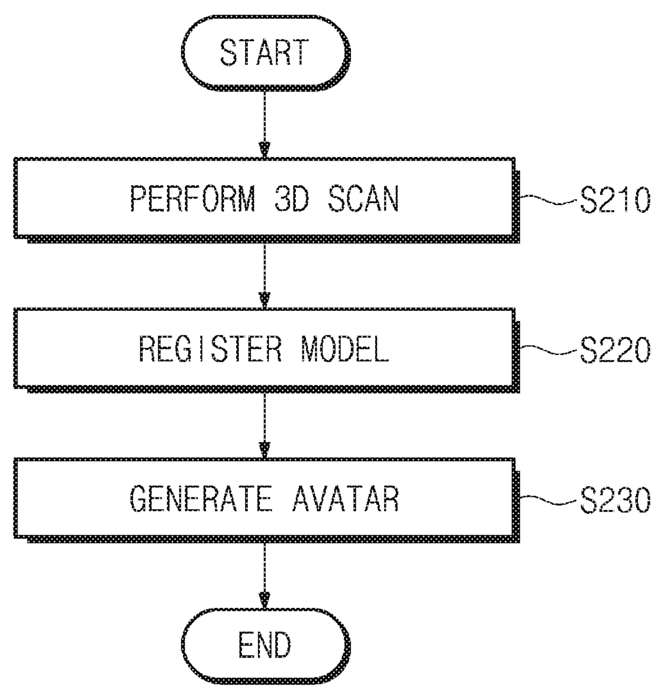
FIG. 3 is a flowchart that shows a method for generating a 3D avatar according to an embodiment of the present invention.
Figure 4:
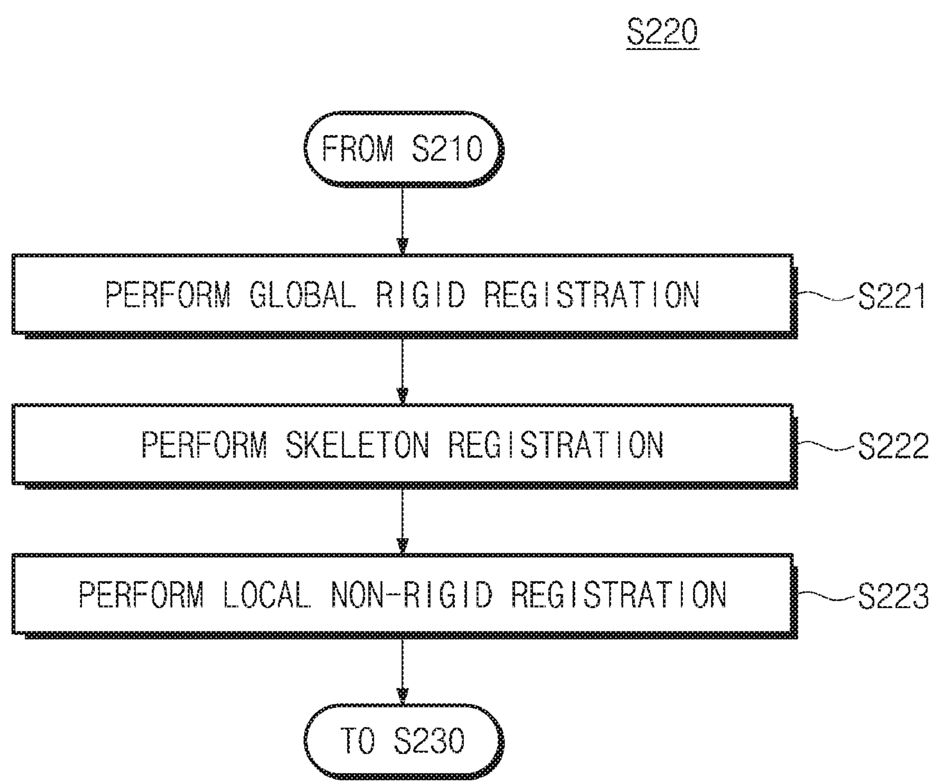
FIG. 4 is a flowchart that specifically shows an example of the model registration step illustrated in FIG. 3.

FIG. 3 is a flowchart that shows a method for generating a 3D avatar according to an embodiment of the present invention. FIG. 4 is a flowchart that specifically shows an example of the model registration step illustrated in FIG. 3.

Referring to FIG. 3, in the method for generating a 3D avatar according to an embodiment of the present invention, first, a 3D scan may be performed at step S210.

That is, at step S210, the 3D scan of the body of a user is performed using an image sensor, and a 3D scan model may be generated using the result of the 3D scan of the body of the user.

Here, the image sensor may be a depth sensor or an RGB sensor.

Here, at step S210, the 3D scan of the body of the user may be performed using a depth image or an RGB image.

Here, at step S210, the 3D scan may be performed using only a depth image, only an RGB image, or a combination thereof.

The generated 3D scan model of the user may be the result of a scan of part of the body or the result of a 360-degree scan of the full body. Here, the 3D scan model may have a hole or a crack therein due to limitations of the sensor or an algorithm.

Also, in the method for generating a 3D avatar according to an embodiment of the present invention, model registration may be performed at step S220.

That is, at step S220, the 3D scan model and a previously stored template avatar may be matched.

Here, the template avatar may be a standard avatar model that represents a human body. Here, the template avatar may include skeleton information and vertex weight information.

Here, at step S220, when the template avatar does not include skeleton information or vertex weight information, the template avatar may be updated using an automatic rigging algorithm so as to include skeleton information and vertex weight information.

Here, at step S220, the 3D scan model and the template avatar may be matched using point-to-point correspondence between the 3D scan model and the template avatar.

Here, at step S220, 6DoF rigid transformation, which adjusts the approximate translation, orientation, and scale of the 3D scan model and the template avatar, may be applied.

Here, the point-to-point correspondence may include information in which one or more positions predefined in the body parts of the 3D scan model and the template avatar are defined as corresponding points.

Here, the one or more positions predefined in the body parts may include at least one of the position of a face, the positions of hands, and the positions of feet.

Here, at step S220, the corresponding points of the 3D scan model and the corresponding points of the template avatar may be defined as pairs of corresponding points based on the one or more positions predefined in the body parts.

Here, at step S220, the pose of the 3D scan model is recognized, whereby the corresponding points of the 3D scan model may be automatically found using an algorithm.

Here, at step S220, at least one of global rigid registration, skeleton-based human pose registration, and local non-rigid registration may be performed.

Here, at step S220, because the template avatar can be transformed through partial registration even when the 3D scan model of the user is incomplete or even when a part of the 3D scan model is missing due to limitations of the sensor or the algorithm, a 3D avatar in which the body shape of the user is reflected may be generated.

Here, at step S220, for the 3D scan model, a part of which is missing, the front side of the body is registered first through partial registration, and then the template avatar, of which the front side is transformed through partial registration, is registered to the 3D scan model, in which case the back side of the template avatar may not be transformed because information pertaining thereto is missing. Additionally, the back side of the template avatar may be transformed.

Here, at step S220, the template avatar is gradually transformed through partial registration, whereby the accuracy and completeness of a 3D avatar, in which the body shape of the user is reflected, may be improved.

Referring to FIG. 4, at step S220, global rigid registration, skeleton registration, and local non-rigid registration may be performed at steps S221, S222, and S223, respectively.

At step S221, using the point-to-point correspondence, the 3D scan model may be registered to the template avatar by moving and rotating the 3D scan model based on the positions of the corresponding points of the template avatar and those of the 3D scan model.

Here, at step S221, based on the 3D scan model, the 6DoF translation and rotation information of the template avatar and the scale information of the template avatar are acquired using the point-to-point correspondence, whereby approximate registration may be performed.

Here, at step S222, the pose of the template avatar may be changed using the point-to-point correspondence and the skeleton information of the template avatar such that the pose of the template avatar matches the pose of the 3D scan model.

In order to represent a slight change in the skeletal structure of a 3D avatar, it is necessary to reflect a slight change in the translation and rotation of each segment in the skeleton. Also, when multiple partial scans of the same person are performed, because the pose of the person may change over time, a registration method that is adaptable to a change in the pose is required.

For example, at step S222, when the template avatar transformed based on a first 3D scan model, which is generated by scanning the front of a user, is transformed again using a second 3D scan model, which is generated by scanning the side of the user, if the pose of the first 3D scan model differs from that of the second 3D scan model, the pose of the template avatar may be changed using the skeleton information thereof, whereby the template avatar may be registered to the 3D scan model.

The template avatar may include the correlation between each predefined bone and each predefined vertex.

That is, because rigging is applied to the template avatar, a change in the pose of bones may cause a change in the pose of the template avatar.

Here, the rigging method used for the template avatar may be linear blend skinning, which is most commonly used. The rigging method is configured to define a weight, which is the influence of each bone on each vertex, and to assign a translation component, corresponding to the weight, to each vertex based on the movement of the bone, and may be represented as shown in Equation (1).

In Equation (1), $V_i$ is the position of one vertex of the template avatar, $N_b$ is the number of bones of a skeleton model, $w_j$ is the weight of a bone, $T_j$ is a rigid transformation matrix for the j-th bone, and $v_j^0$ is the local coordinates of the vertex with respect to the j-th bone when the template avatar is in the reference pose.

Here, at step S222, the joint angle between bones and the coordinates of joints may be optimized in order to match the pose of the template avatar and the pose of the 3D scan model of the user.

Here, at step S222, an operation for finding the rigid transformation matrix of a joint, through which the sum of the values of the three error functions shown in Equation (2) may be minimized, may be performed.

In Equation (2), $E_f$ is an error function pertaining to the distance between corresponding points, and $\alpha$ is a weight therefor. $E_d$ is an error function for minimizing the distance between the template avatar and the 3D scan model of the user, and $\beta$ is a weight therefor. $E_s$ is a function for minimizing the sum of the rotation angles of joints, and $\gamma$ is a weight therefor.

The error function $E_d$ for minimizing the distance between the skeleton of the template avatar and the 3D scan model of the user may be defined as shown in Equation (3).

In Equation (3), dist( ) is a function for calculating the minimum distance between skin($V_i$), which is the vertex transformed using the rigid transformation matrix of the relevant joint, and D, which is the surface of the 3D scan model of the user, and $N_m$ is the number of vertices of the template avatar.

Here, the corresponding points of the 3D scan model, which are input from the user, may converge to local minima. In order to prevent this, the error function $E_f$ pertaining to the distance between the corresponding point of the template avatar and that of the 3D scan model of the user may be defined as shown in Equation (4).

In Equation (4), $F_M$ and $F_D$ are user-defined corresponding points of the template avatar M and the 3D scan model D of the user. Here, the function may be calculated so as to minimize the distance between $F_D$ and skin($F_M$), which is the point acquired by transforming $F_M$ using the rigid transformation matrix of the joint. Here, $N_f$ is the number of user-defined corresponding points.

Also, the error function for maintaining the shape of the template avatar M may be defined using the quaternion, which corresponds to the rotation of the joint angle, as shown in Equation (5).

In Equation (5), $N_b$ is the number of bones, $q_i$ indicates the rotation of the joint i, and $E_i$ is an objective function for minimizing the sum of the rotation angles of the joints.

That is, at step S222, in order to minimize the differences between the positions of the corresponding points of the template avatar and those of the 3D scan model, the minimum distances from the corresponding points of the template avatar, the pose of which is changed using the skeleton information, to the corresponding points of the 3D scan model are calculated, and the pose of the template avatar is changed based on the minimum distances between the corresponding points and the minimum distance from each of the vertices of the template avatar to the 3D scan model, whereby the template avatar may be registered to the 3D scan model.

At step S223, the position of each of the vertices of the template avatar is adjusted using an affine transformation matrix for each vertex, whereby the minimum distance between the surface of the template avatar and the surface of the 3D scan model may be calculated.

Here, at step S223, the position of each of the vertices of the template avatar M is adjusted using an affine transformation matrix, whereby the distance from the 3D scan model D of the user may be minimized.

Here, at step S223, an error function may be defined as shown in Equation (6).

In Equation (6), $E_f$ is an error function pertaining to the distance between corresponding points, and $\alpha$ is a weight therefor. $E_d$ is an error function for minimizing the distance between the template avatar and the 3D scan model of the user, and $\beta$ is a weight therefor. $E_s$ is a requirement for maintaining the basic shape of the template avatar.

Here, at step S223, the error function $E_d$ for minimizing the distance between the template avatar M and D, which is the surface of the 3D scan model of the user, may be defined as shown in Equation (7).

In Equation (7), dist( ) is a function for calculating the minimum distance between the point acquired by transforming a vertex $V_i$ of the template avatar using the affine transformation matrix $T_i$ and D, which is the surface of the 3D scan model of the user, and $N_m$ is the number of vertices of the template avatar. Here, the distance may be calculated by measuring the shortest distance from a triangular mesh.

Here, at step S223, the error function pertaining to the distance between the corresponding points input by a user may be defined as shown in Equation (8).

In Equation (8), $F_M$ and $F_D$ are the user-defined corresponding points of the template avatar M and the 3D scan model D of the user. Here, the operation may be performed such that the distance between $F_D$ and the point acquired by transforming $F_M$ using the affine transformation matrix $T_i$ is minimized. Here, $N_f$ is the number of user-defined corresponding points.

Finally, at step S223, an error function for minimizing the difference between the transformation matrices of all edges may be defined as a requirement for maintaining the shape of the template avatar M.

If the two vertices of any edge $e_i$ are similarly transformed, the difference between the transformation matrices of the two vertices converges to a zero matrix. Using this, Equation (9) may defined.

In Equation (9), the transformation matrices for the two vertices of an arbitrary edge are represented as $T_i$ and $T_j$, and $N_s$ is the number of edges of the template avatar M.

Also, at step S220, according to an embodiment, global rigid registration, skeleton-based pose registration, and local non-rigid registration may be separately used, or two or more thereof may be collectively used.

For example, at step S220, when the translation, rotation, and scale of the template avatar are adjusted in advance to match the 3D scan model, the template avatar and the 3D scan model may be matched by performing only skeleton-based pose registration and local non-rigid registration, without performing global rigid registration.

Also, when the pose of the 3D scan model is the same as the pose of the template avatar, only local non-rigid registration may be performed, without performing skeleton-based pose registration at step S220.

Also, at step S220, only the registration function selected by a user may be performed according to an embodiment.

Also, in the method for generating a 3D avatar according to an embodiment of the present invention, a 3D avatar may be generated at step S230.

That is, at step S230, a 3D avatar may be generated based on the result of matching the 3D scan model and the template avatar.

Here, the 3D avatar may be a refined and animatable avatar in which rigging information and vertex weight information are incorporated by reflecting the body shape of the user.

Here, at step S230, an exercise prescription in the form of an animation using the generated 3D avatar may be provided to a user, or the generated 3D avatar may be used as the character of the user in a game or the like.

Here, the 3D avatar may be used to provide information about the body shape of the user using the 3D surface information and the skeleton information thereof.

For example, circumference information, such as a head circumference, a chest measurement, or the like, may be calculated using a plane defined with a point, corresponding to a position defined in the skeleton information of the 3D avatar, and with a normal vector defined with the orientation of the skeleton. Also, the ratio of the length of an arm to the length of a leg, the ratio of a chest measurement to a hip circumference, and the like may be calculated using the skeleton information, and the volume of the user avatar may be determined using the vertex information. Here, the body shape information of the 3D avatar may be automatically calculated based on the skeleton information of the 3D avatar, whereby consistent body shape information of each user may be maintained. Also, the body shape information of the 3D avatar may be used to track changes in the body shape of the user over time.

Here, at step S230, even when a part of the body is not registered due to the partial nature of a 3D scan model, a 3D avatar may be generated by gradually reflecting the body shape of a user.

Here, at step S230, even when a full 3D scan is impossible, an avatar in which a part of the body shape of a user is reflected may be generated based on the result of the partial scan of the body.

Here, at step S230, because an avatar can be further transformed based on the result of an additional scan of the body, the degree to which the body shape of the user is reflected may be gradually improved.

Here, at step S230, an animatable avatar based on a refined mesh may be generated.

Here, at step S230, an animatable 3D avatar in which the body shape of a user is reflected may be generated in spite of incompleteness of a 3D scan of the body.

Here, at step S230, the incompleteness of the 3D scan result, which is caused due to the noise of a consumer-grade depth sensor or an RGB sensor, holes, or limitations of a 3D scan algorithm, may be compensated for, whereby a 3D avatar may be generated.

Here, at step S230, in spite of the incompleteness of the 3D scan result, a 3D avatar in which the body shape of a user is reflected may be generated such that the 3D avatar based on a refined 3D mesh is capable of motion through animation.

Here, at step S230, using the avatar in which the 3D body shape of the user is reflected, the volume of the body may be automatically measured from the consistent body shape based on the skeleton, and the ratio between the body parts and the circumferences of the body parts may also be automatically measured.

Here, at step S230, the volume of the body of the user may be measured using the surface mesh information of the generated 3D avatar.

Here, at step S230, body proportions may be measured using the skeleton information of the generated 3D avatar and the bounding box of the surface of the generated 3D avatar.

Here, at step S230, the circumferences of body parts may be automatically measured using information about the position of the skeleton of the generated 3D avatar and the surface information thereof.

Figure 5:
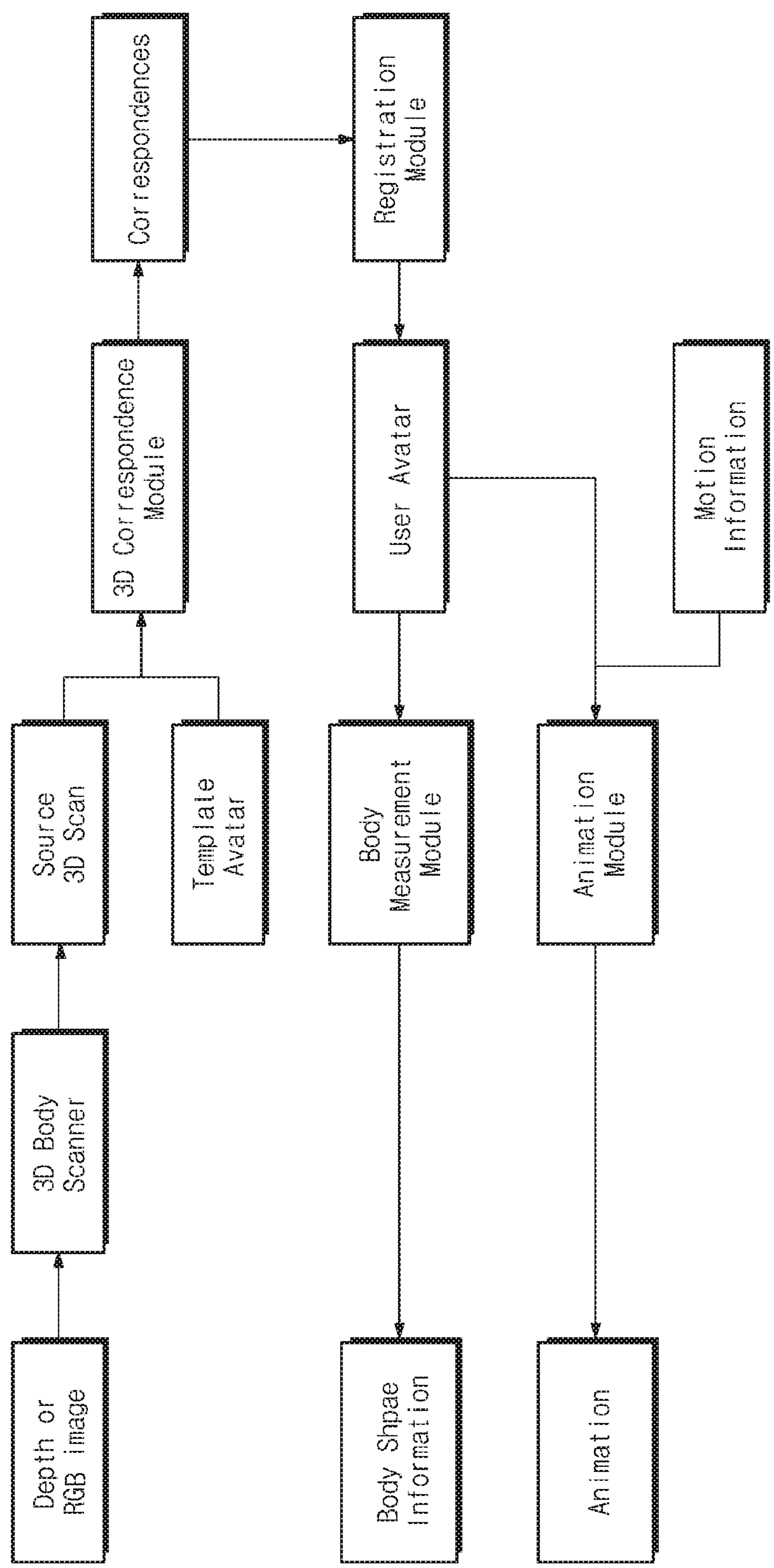
FIG. 5 is a view that shows the process of generating a 3D avatar according to an embodiment of the present invention.

FIG. 5 is a view that shows the process of generating a 3D avatar according to an embodiment of the present invention.

Referring to FIG. 5, in the process of generating a 3D avatar according to an embodiment of the present invention, first, an apparatus for generating a 3D avatar may perform a 3D scan.

That is, the apparatus for generating a 3D avatar may perform a 3D scan of the body of a user using an image sensor and generate a 3D scan model using the result of the 3D scan of the body of the user.

Here, the image sensor (3D body scanner) may be a depth sensor or an RGB sensor.

Here, the apparatus for generating a 3D avatar may perform the 3D scan of the body of the user using a depth image or an RGB image.

Here, the apparatus for generating a 3D avatar may perform the 3D scan using only a depth image, only an RGB image, or a combination thereof.

The generated 3D scan model of the user (source 3D scan) may be the result of a scan of part of the body or the result of a 360-degree scan of the full body.

Here, the 3D scan model may have a hole or a crack due to limitations of the sensor or an algorithm.

The apparatus for generating a 3D avatar may match the 3D scan model with a previously stored template avatar through a model registration module (3D correspondence module).

Here, the template avatar may be a standard avatar model that represents a human body. Here, the template avatar may include skeleton information and vertex weight information.

Here, when the template avatar does not include skeleton information or vertex weight information, the apparatus for generating a 3D avatar may update the template avatar so as to include skeleton information and vertex weight information using an automatic rigging algorithm.

Here, the apparatus for generating a 3D avatar may match the 3D scan model and the template avatar using point-to-point correspondence between the 3D scan model and the template avatar.

Here, the apparatus for generating a 3D avatar may apply 6DoF rigid transformation, which adjusts the approximate translation, orientation, and scale of the 3D scan model and the template avatar.

Here, the point-to-point correspondence may include information in which one or more positions predefined in the body parts of the 3D scan model and the template avatar are defined as corresponding points.

Here, the one or more positions predefined in the body parts may include at least one of the position of a face, the positions of hands, and the positions of feet.

Here, the apparatus for generating a 3D avatar may define the corresponding points of the 3D scan model and the corresponding points of the template avatar as pairs of corresponding points based on the one or more positions predefined in the body parts.

Here, the apparatus for generating a 3D avatar may recognize the pose of the 3D scan model and automatically find the corresponding points of the 3D scan model using an algorithm.

Here, the apparatus for generating a 3D avatar may perform at least one of global rigid registration, skeleton-based human pose registration, and local non-rigid registration.

The apparatus for generating a 3D avatar may register the 3D scan model to the template avatar by moving and rotating the 3D scan model based on the positions of the corresponding points of the template avatar and the positions of the corresponding points of the 3D scan model using the point-to-point correspondence.

Here, the apparatus for generating a 3D avatar may perform approximate registration by acquiring the 6DoF translation and rotation information of the template avatar and the scale information thereof based on the 3D scan model using the point-to-point correspondence.

The apparatus for generating a 3D avatar may change the pose of the template avatar using the point-to-point correspondence and the skeleton information of the template avatar such that the pose of the template avatar matches the pose of the 3D scan model, thereby performing skeleton-based human pose registration.

In order to represent a slight change in the skeletal structure of a 3D avatar, it is necessary to reflect a slight change in the translation and rotation of each segment in the skeleton. Also, when multiple partial scans of the same person are performed, because the pose of the person may change over time, a registration method that is adaptable to changes in the pose is required.

For example, when the template avatar transformed based on a first 3D scan model, which is generated by scanning the front of a user, is transformed again using a second 3D scan model, which is generated by scanning the side of the user, if the pose of the first 3D scan model differs from that of the second 3D scan model, the apparatus for generating a 3D avatar changes the pose of the template avatar using the skeleton information, thereby registering the template avatar to the 3D scan model.

The template avatar may include the correlation between each predefined bone and each predefined vertex.

That is, because rigging is applied to the template avatar, a change in the pose of bones may cause a change in the pose of the template avatar.

Here, the rigging method used for the template avatar may be linear blend skinning, which is most commonly used. The rigging method is configured to define a weight, which is the influence of each bone on each vertex, and to assign a translation component, corresponding to the weight, to each vertex based on the movement of the bone, and may be represented as shown in Equation (1).

In Equation (1), $V_i$ is the position of one vertex of the template avatar, $N_b$ is the number of bones of a skeleton model, $w_j$ is the weight of a bone, $T_j$ is a rigid transformation matrix for the j-th bone, and $v_j^0$ is the local coordinates of the vertex with respect to the j-th bone when the template avatar is in the reference pose.

Here, the apparatus for generating a 3D avatar may optimize the joint angle between bones and the coordinates of joints in order to match the pose of the template avatar and the pose of the 3D scan model of the user.

Here, the apparatus for generating a 3D avatar may perform an operation for finding the rigid transformation matrix of a joint, through which the sum of the values of the three error functions shown in Equation (2) may be minimized.

In Equation (2), $E_f$ is an error function pertaining to the distance between corresponding points, and $\alpha$ is a weight therefor. $E_d$ is an error function for minimizing the distance between the template avatar and the 3D scan model of the user, and $\beta$ is a weight therefor. $E_s$ is a function for minimizing the sum of the rotation angles of joints, and $\gamma$ is a weight therefor.

The error function $E_d$ for minimizing the distance between the skeleton of the template avatar and the 3D scan model of the user may be defined as shown in Equation (3).

In Equation (3), dist( ) is a function for calculating the minimum distance between skin($V_i$), which is the vertex transformed using the rigid transformation matrix of the relevant joint, and D, which is the surface of the 3D scan model of the user, and $N_m$ is the number of vertices of the template avatar.

Here, the corresponding points of the 3D scan model, which are input from the user, may converge to local minima. In order to prevent this, the error function $E_f$ pertaining to the distance between the corresponding point of the template avatar and that of the 3D scan model of the user may be defined as shown in Equation (4).

In Equation (4), $F_M$ and $F_D$ are user-defined corresponding points of the template avatar M and the 3D scan model D of the user. The function may be calculated so as to minimize the distance between $F_D$ and skin($F_M$), which is the point acquired by transforming $F_M$ using the rigid transformation matrix of the joint. Here, $N_f$ is the number of user-defined corresponding points.

Also, the error function for maintaining the shape of the template avatar M may be defined using the quaternion, which corresponds to the rotation of the joint angle, as shown in Equation (5).

In Equation (5), $N_b$ is the number of bones, $q_i$ indicates the rotation of the joint i, and $E_s$ is an objective function for minimizing the sum of the rotation angles of the joints.

That is, in order to minimize the differences between the positions of the corresponding points of the template avatar and those of the 3D scan model, the apparatus for generating a 3D avatar calculates the minimum distances from the corresponding points of the template avatar, the pose of which is changed using the skeleton information, to the corresponding points of the 3D scan model and changes the pose of the template avatar based on the minimum distances between the corresponding points and the minimum distance from each of the vertices of the template avatar to the 3D scan model, thereby registering the template avatar to the 3D scan model.

The apparatus for generating a 3D avatar adjusts the position of each of the vertices of the template avatar using an affine transformation matrix for each vertex, thereby calculating the minimum distance between the surface of the template avatar and the surface of the 3D scan model.

Here, the apparatus for generating a 3D avatar adjusts the position of each of the vertices of the template avatar M using an affine transformation matrix, thereby minimizing the distance from the 3D scan model D of the user.

Here, the apparatus for generating a 3D avatar may define an error function as shown in Equation (6).

In Equation (6), $E_f$ is an error function pertaining to the distance between corresponding points, and $\alpha$ is a weight therefor. $E_d$ is an error function for minimizing the distance between the template avatar and the 3D scan model of the user, and $\beta$ is a weight therefor. $E_s$ is a requirement for maintaining the basic shape of the template avatar.

Here, the apparatus for generating a 3D avatar may define the error function $E_d$ for minimizing the distance between the template avatar M and D, which is the surface of the 3D scan model of the user, as shown in Equation (7).

In Equation (7), dist( ) is a function for calculating the minimum distance between D, which is the surface of the 3D scan model of the user, and the point acquired by transforming a vertex $V_i$ of the template avatar using the affine transformation matrix $T_i$, and $N_m$ is the number of vertices of the template avatar. Here, the distance may be acquired by measuring the shortest distance from a triangular mesh.

Here, the apparatus for generating a 3D avatar may define the error function pertaining to the distance between the corresponding points, which are input by a user, as shown in Equation (8).

In Equation (8), $F_M$ and $F_D$ are the user-defined corresponding points of the template avatar M and the 3D scan model D of the user. Here, the operation is performed such that the distance between $F_D$ and the point acquired by transforming $F_M$ using the affine transformation matrix $T_i$ is minimized. Here, $N_f$ is the number of user-defined corresponding points.

Finally, the apparatus for generating a 3D avatar may define an error function for minimizing the difference between the transformation matrices of all edges as a requirement for maintaining the shape of the template avatar M.

If the two vertices of any edge $e_i$ are similarly transformed, the difference between the transformation matrices of the two vertices converges to a zero matrix. Using this, Equation (9) may defined.

In Equation (9), the transformation matrices of the two vertices of an arbitrary edge are represented as $T_i$ and $T_j$, and $N_s$ is the number of edges of the template avatar M.

Also, according to an embodiment, the apparatus for generating a 3D avatar may separately use global rigid registration, skeleton-based pose registration, and local non-rigid registration, or may collectively use two or more thereof.

For example, when the translation, rotation, and scale of the template avatar are adjusted in advance to match the 3D scan model, the apparatus for generating a 3D avatar may match the template avatar and the 3D scan model by performing only skeleton-based pose registration and local non-rigid registration, without performing global rigid registration.

Also, when the pose of the 3D scan model is the same as the pose of the template avatar, only local non-rigid registration may be performed, without performing skeleton-based pose registration.

Also, the apparatus for generating a 3D avatar may perform only the registration function selected by a user according to an embodiment.

Also, the apparatus for generating a 3D avatar may generate a 3D user avatar based on the result of matching the 3D scan model and the template avatar.

Here, the 3D avatar may be a refined and animatable avatar in which rigging information and vertex weight information are incorporated by reflecting the body shape of the user.

Here, the apparatus for generating a 3D avatar may provide a user with an exercise prescription in the form of an animation using the generated 3D avatar, or the generated 3D avatar may be used as the character of the user in a game or the like through an animation module.

Here, through a body measurement module, the 3D avatar may be used to provide information about the body shape of the user using the 3D surface information and skeleton information thereof. For example, circumference information, such as a head circumference, a chest measurement, or the like, may be calculated using a plane defined with a point, corresponding to a position defined in the skeleton information of the 3D avatar, and with a normal vector defined with the orientation of the skeleton. Also, the ratio of the length of an arm to the length of a leg, the ratio of a chest measurement to a hip circumference, and the like may be calculated using the skeleton information, and the volume of the user avatar may be determined using the vertex information. Here, the body shape information of the 3D avatar may be automatically calculated based on the skeleton information of the 3D avatar, whereby consistent body shape information of each user may be maintained. Also, the body shape information of the 3D avatar may be used for tracking changes in the body shape of the user over time.

Here, even when a part of the body is not registered due to the partial nature of a 3D scan model, the apparatus for generating a 3D avatar may generate a 3D avatar by gradually reflecting the body shape of a user.

Here, even when a full 3D scan is impossible, the apparatus for generating a 3D avatar may generate an avatar in which a part of the body shape of a user is reflected based on the result of the partial scan of the body.

Here, because an avatar can be further transformed based on the result of an additional scan of the body, the apparatus for generating a 3D avatar may gradually improve the degree to which the body shape of the user is reflected.

Here, the apparatus for generating a 3D avatar may generate an animatable avatar based on a refined mesh.

Here, the apparatus for generating a 3D avatar may generate an animatable 3D avatar in which the body shape of a user is reflected in spite of an incomplete 3D scan of the body.

Here, the apparatus for generating a 3D avatar may overcome the incompleteness of the 3D scan result, which is caused due to the noise of a consumer-grade depth sensor or an RGB sensor, holes, or limitations of a 3D scan algorithm, and generate a 3D avatar.

Here, in spite of the incompleteness of the 3D scan result, the apparatus for generating a 3D avatar may generate a 3D avatar in which the body shape of a user is reflected such that the 3D avatar based on a refined 3D mesh is capable of motion through animation.

Here, using the avatar in which the 3D body shape of the user is reflected, the apparatus for generating a 3D avatar may automatically measure the volume of the body from the consistent body shape based on the skeleton and measure the ratio between the body parts and the circumferences of the body parts.

Here, the apparatus for generating a 3D avatar may measure the volume of the body of the user using the surface mesh information of the generated 3D avatar.

Here, the apparatus for generating a 3D avatar may measure body proportions using the skeleton information of the generated 3D avatar and the bounding box of the surface of the generated 3D avatar.

Here, the apparatus for generating a 3D avatar may automatically measure the circumferences of the body parts using information about the position of the skeleton of the generated 3D avatar and the surface information thereof.

Figure 6:
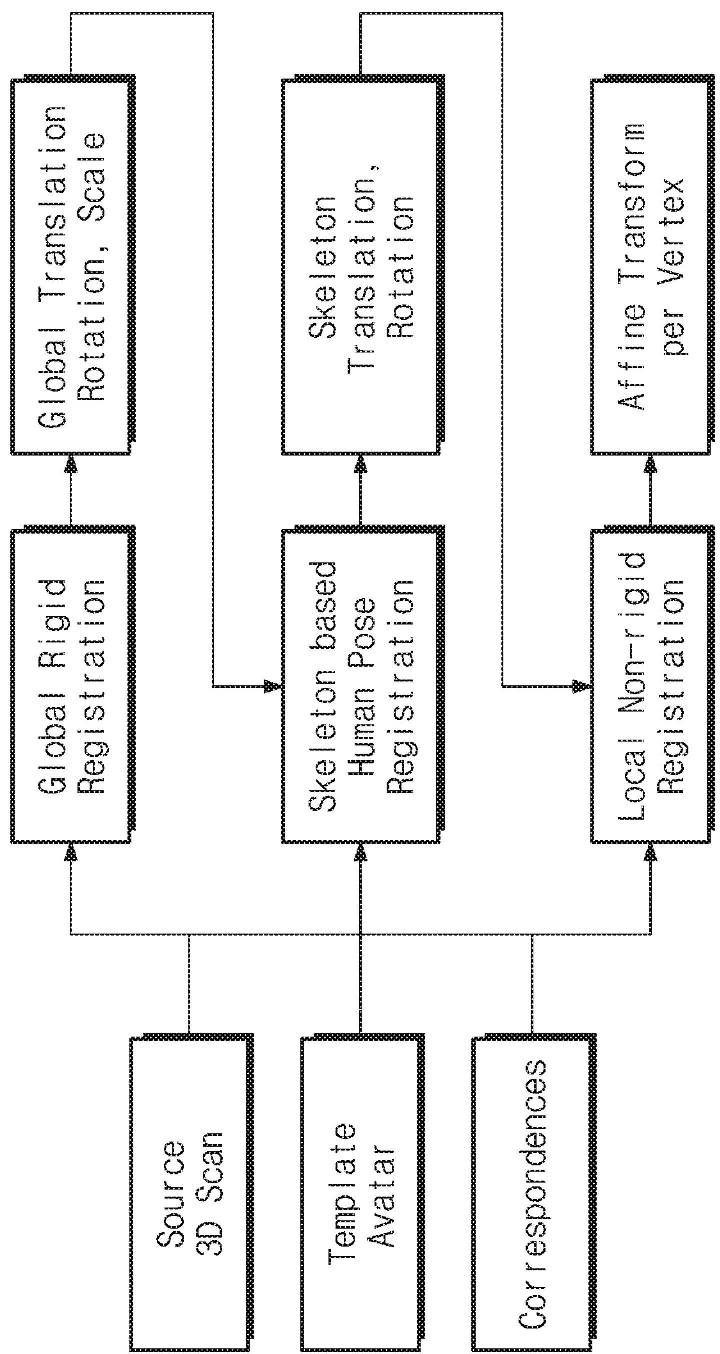
FIG. 6 is a view that shows a model registration process according to an embodiment of the present invention.

FIG. 6 is a view that shows a model registration process according to an embodiment of the present invention.

Referring to FIG. 6, the apparatus for generating a 3D avatar may perform at least one of global rigid registration, skeleton-based human pose registration, and local non-rigid registration.

The apparatus for generating a 3D avatar may register the 3D scan model to the template avatar by moving and rotating the 3D scan model based on the positions of the corresponding points of the template avatar and the positions of the corresponding points of the 3D scan model using the point-to-point correspondence.

Here, the apparatus for generating a 3D avatar may perform approximate registration by acquiring the 6DoF translation and rotation information of the template avatar and the scale information thereof based on the 3D scan model using the point-to-point correspondence.

The apparatus for generating a 3D avatar may change the pose of the template avatar using the point-to-point correspondence and the skeleton information of the template avatar such that the pose of the template avatar matches that of the 3D scan model, whereby skeleton-based human pose registration may be performed.

In order to represent a slight change in the skeletal structure of a 3D avatar, it is necessary to reflect a slight change in the translation and rotation of each segment in the skeleton. Also, when multiple partial scans of the same person are performed, because the pose of the person may change over time, a registration method that is adaptable to changes in the pose is required.

For example, when the template avatar transformed based on a first 3D scan model, which is generated by scanning the front of a user, is transformed again using a second 3D scan model, which is generated by scanning the side of the user, if the pose of the first 3D scan model differs from that of the second 3D scan model, the apparatus for generating a 3D avatar changes the pose of the template avatar using the skeleton information, thereby registering the template avatar to the 3D scan model.

The template avatar may include the correlation between each predefined bone and each predefined vertex.

That is, because rigging is applied to the template avatar, a change in the pose of bones may cause a change in the pose of the template avatar.

Here, the rigging method used for the template avatar may be linear blend skinning, which is most commonly used. The rigging method is configured to define a weight, which is the influence of each bone on each vertex, and to assign a translation component, corresponding to the weight, to each vertex based on the movement of the bone, and may be represented as shown in Equation (1).

In Equation (1), $V_i$ is the position of one vertex of the template avatar, $N_b$ is the number of bones of a skeleton model, $w_j$ is the weight of a bone, $T_j$ is a rigid transformation matrix for the j-th bone, and $v_j^0$ is the local coordinates of the vertex with respect to the j-th bone in the reference pose.

Here, the apparatus for generating a 3D avatar may optimize the joint angle between bones and the coordinates of joints in order to match the pose of the template avatar and the pose of the 3D scan model of the user.

Here, the apparatus for generating a 3D avatar may perform an operation for finding the rigid transformation matrix of a joint, through which the sum of the values of the three error functions shown in Equation (2) may be minimized.

In Equation (2), $E_f$ is an error function pertaining to the distance between corresponding points, and $\alpha$ is a weight therefor. $E_d$ is an error function for minimizing the distance between the template avatar and the 3D scan model of the user, and $\beta$ is a weight therefor. $E_s$ is a function for minimizing the sum of the rotation angles of joints, and $\gamma$ is a weight therefor.

The error function $E_d$ for minimizing the distance between the skeleton of the template avatar and the 3D scan model of the user may be defined as shown in Equation (3).

In Equation (3), dist is a function for calculating the minimum distance between skin($V_i$), which is the vertex transformed using the rigid transformation matrix of the relevant joint, and D, which is the surface of the 3D scan model of the user, and $N_m$ is the number of vertices of the template avatar.

Here, the corresponding points of the 3D scan model, which are input from the user, may converge to local minima. In order to prevent this, the error function $E_f$ pertaining to the distance between the corresponding point of the template avatar and that of the 3D scan model of the user may be defined as shown in Equation (4).

In Equation (4), $F_M$ and $F_D$ are user-defined corresponding points of the template avatar M and the 3D scan model D of the user. The function may be calculated so as to minimize the distance between skin($F_M$), which is the point acquired by transforming $F_M$ using the rigid transformation matrix of the joint, and $F_D$. Here, $N_f$ is the number of user-defined corresponding points.

Also, the error function for maintaining the shape of the template avatar M may be defined using the quaternion, which corresponds to the rotation of the joint angle, as shown in Equation (5).

In Equation (5), $N_b$ is the number of bones, $q_i$ indicates the rotation of the joint i, and $E_i$ is an objective function for minimizing the sum of the rotation angles of the joints.

That is, in order to minimize the differences between the positions of the corresponding points of the template avatar and those of the 3D scan model, the apparatus for generating a 3D avatar calculates the minimum distances from the corresponding points of the template avatar, the pose of which is changed using the skeleton information, to the corresponding points of the 3D scan model and changes the pose of the template avatar based on the minimum distances between the corresponding points and the minimum distance from each of the vertices of the template avatar to the 3D scan model, thereby registering the template avatar to the 3D scan model.

The apparatus for generating a 3D avatar adjusts the position of each of the vertices of the template avatar using an affine transformation matrix for each vertex, thereby calculating the minimum distance between the surface of the template avatar and the surface of the 3D scan model.

Here, the apparatus for generating a 3D avatar adjusts the position of each of the vertices of the template avatar M using an affine transformation matrix, thereby minimizing the distance from the 3D scan model D of the user.

Here, the apparatus for generating a 3D avatar may define an error function as shown in Equation (6).

In Equation (6), $E_f$ is an error function pertaining to the distance between corresponding points, and $\alpha$ is a weight therefor. $E_d$ is an error function for minimizing the distance between the template avatar and the 3D scan model of the user, and $\beta$ is a weight therefor. $E_s$ is a requirement for maintaining the basic shape of the template avatar.

Here, the apparatus for generating a 3D avatar may define the error function $E_d$ for minimizing the distance between the template avatar M and D, which is the surface of the 3D scan model of the user, as shown in Equation (7).

In Equation (7), dist( ) is a function for calculating the minimum distance between the point acquired by transforming a vertex $V_i$ of the template avatar using the affine transformation matrix $T_i$, and D, which is the surface of the 3D scan model of the user, and $N_m$ is the number of vertices of the template avatar. Here, the distance may be calculated by measuring the shortest distance from a triangular mesh.

Here, the apparatus for generating a 3D avatar may define the error function pertaining to the distance between the corresponding points input by a user, as shown in Equation (8).

In Equation (8), $F_M$ and $F_D$ are the user-defined corresponding points of the template avatar M and the 3D scan model D of the user. Here, the operation may be performed such that the distance between $F_D$ and the point acquired by transforming $F_M$ using the affine transformation matrix $T_i$ is minimized. Here, $N_f$ is the number of user-defined corresponding points.

Finally, the apparatus for generating a 3D avatar may define an error function for minimizing the difference between the transformation matrices of all edges as a requirement for maintaining the shape of the template avatar M.

If the two vertices of any edge $e_i$ are similarly transformed, the difference between the transformation matrices of the two vertices converges to a zero matrix. Using this, Equation (9) may defined.

In Equation (9), the transformation matrices of the two vertices of an arbitrary edge are represented as $T_i$ and $T_j$, and $N_s$ is the number of edges of the template avatar M.

Also, according to an embodiment, the apparatus for generating a 3D avatar may separately use global rigid registration, skeleton-based pose registration, and local non-rigid registration, or may collectively use two or more thereof.

For example, when the translation, rotation, and scale of the template avatar are adjusted in advance to match the 3D scan model, the apparatus for generating a 3D avatar may register the template avatar to the 3D scan model by performing only skeleton-based pose registration and local non-rigid registration, without performing global rigid registration.

Also, when the pose of the 3D scan model is the same as the pose of the template avatar, only local non-rigid registration may be performed, without performing skeleton-based pose registration.

Also, the apparatus for generating a 3D avatar may perform only the registration function selected by a user according to an embodiment.

FIGS. 7 to 10 are views that show the process of registering a 3D scan model and a template avatar according to an embodiment of the present invention.

Figure 7:
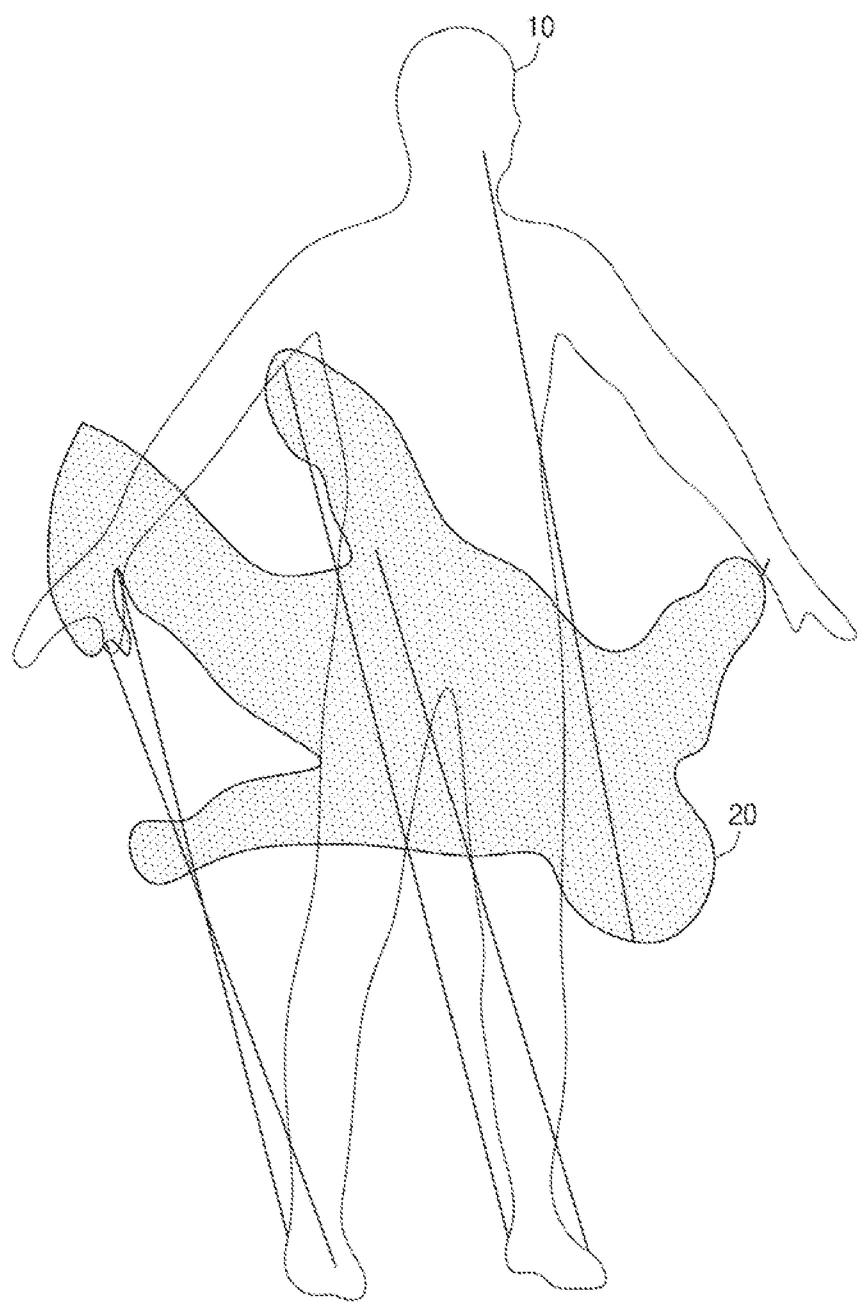
FIGS. 7 to 10 are views that show the process of registering a 3D model according to an embodiment of the present invention.
Figure 8:
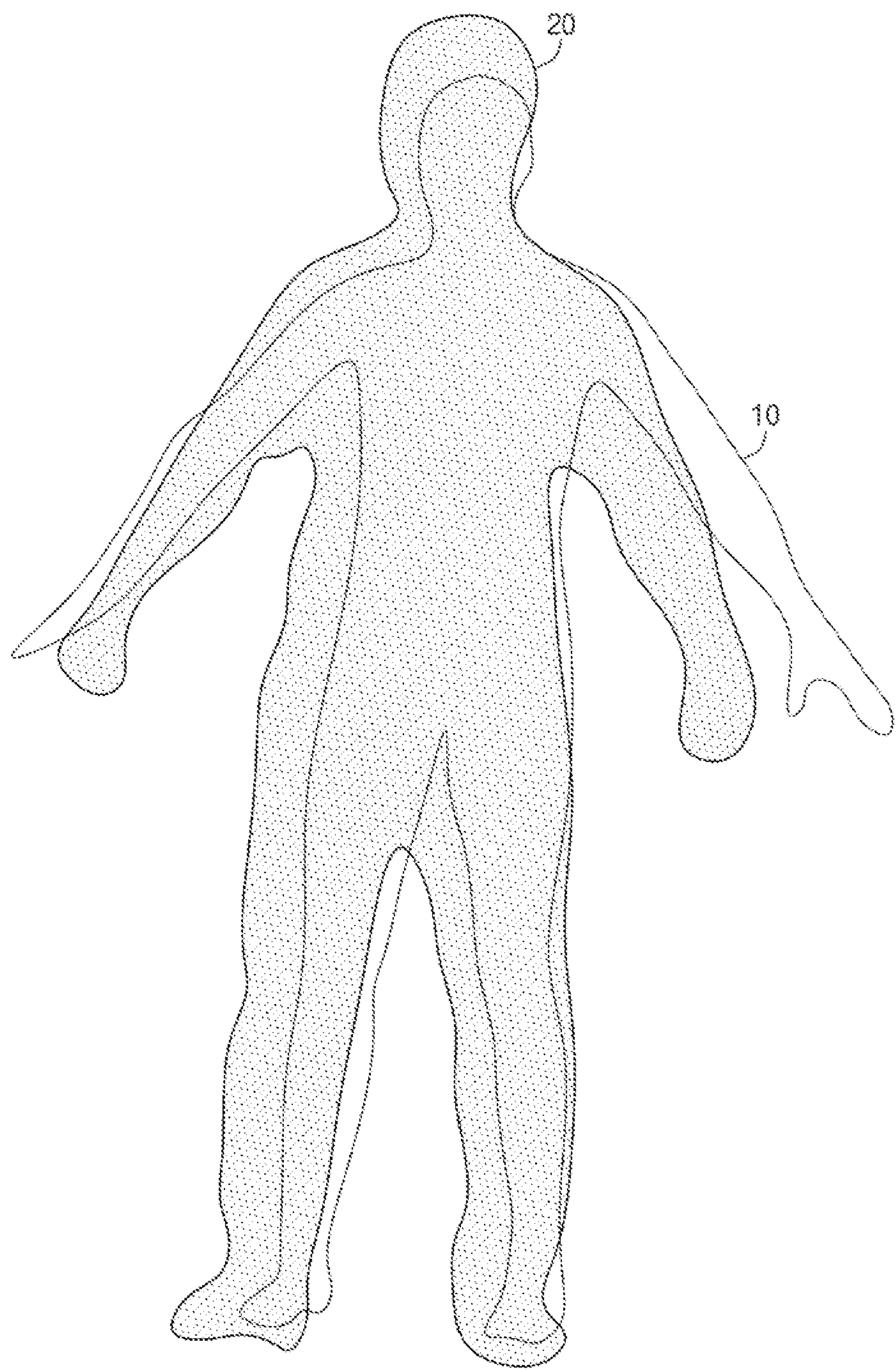

Referring to FIG. 7 and FIG. 8, based on the lines that pairwise connect the corresponding points of a previously stored template avatar 10 with those of an input 3D scan model 20, the apparatus for generating a 3D avatar moves and rotates the 3D scan model 20, thereby registering the 3D scan model to the template avatar 10. Accordingly, global rigid registration may be performed, as shown in FIG. 8.

Figure 9:
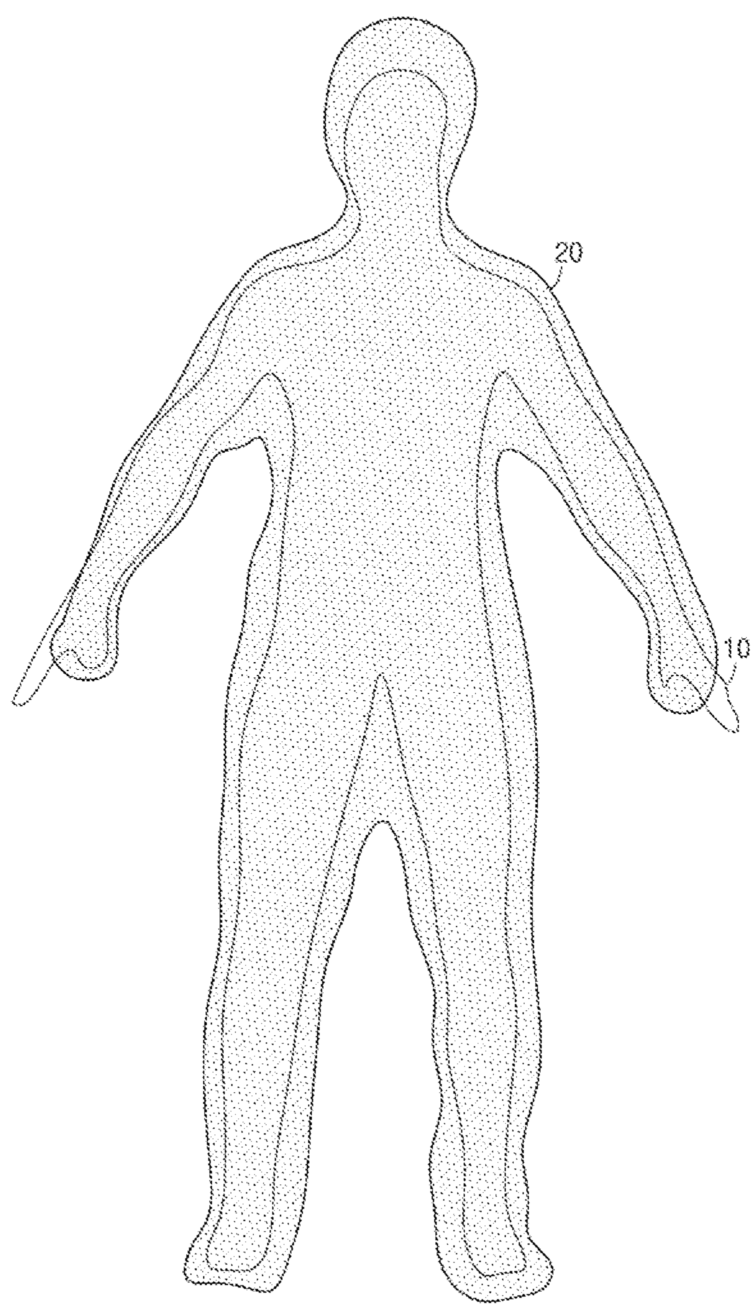

Referring to FIG. 8 and FIG. 9, the apparatus for generating a 3D avatar changes the pose of the template avatar 10 using the skeleton information thereof in order to minimize the difference between the pose of the template avatar 10 and the pose of the 3D scan model 20 of the user, as shown in FIG. 8, thereby performing skeleton-based pose registration, as shown in FIG. 9.

Figure 10:
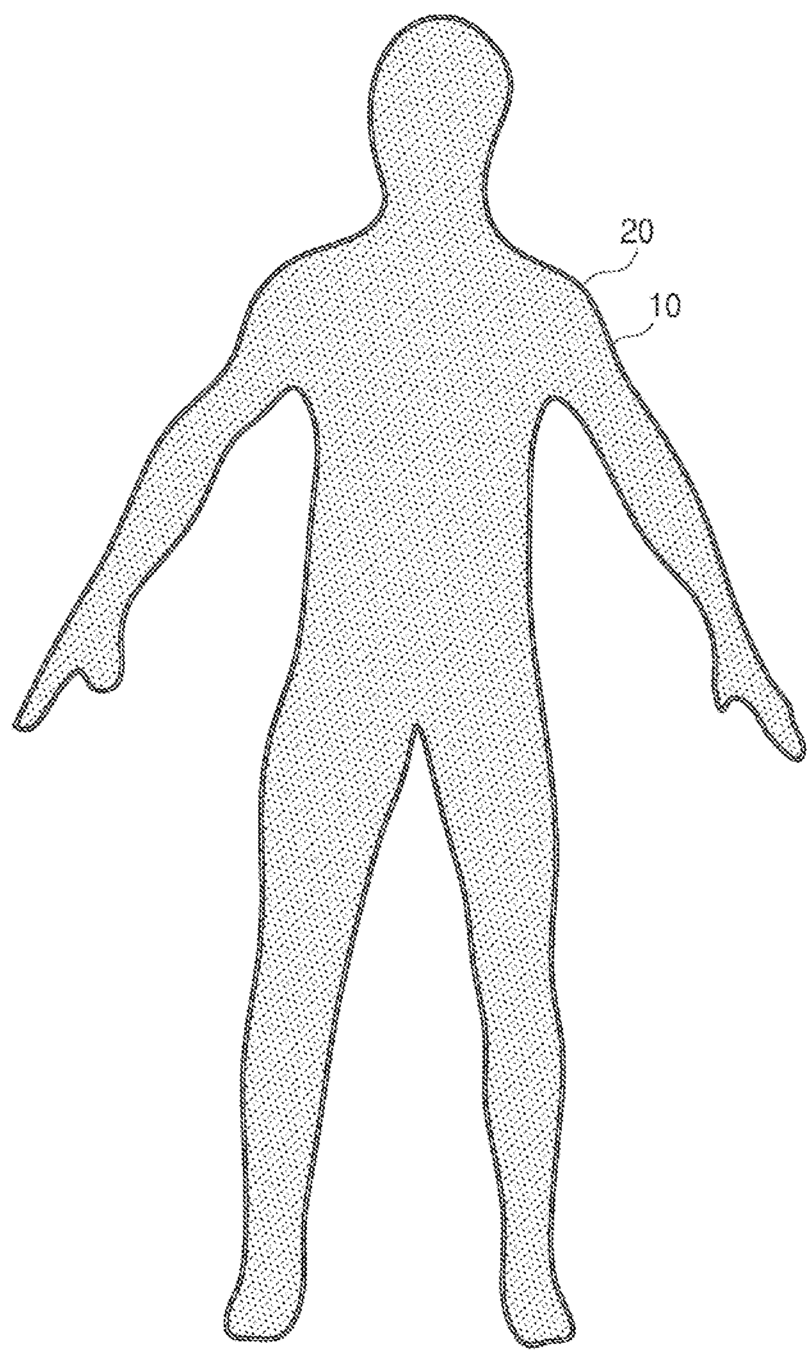

Referring to FIG. 9 and FIG. 10, the apparatus for generating a 3D avatar minimizes the distances from the corresponding points of the template avatar 10 to the corresponding points of the 3D scan model 20 of the user using the vertex information of the template avatar 10 in order to minimize the difference between the volume of the template avatar 10 and the volume of the 3D scan model 20 of the user, as shown in FIG. 9, thereby performing local non-rigid registration, as shown in FIG. 10.

That is, as shown in FIGS. 7 to 10, the apparatus for generating a 3D avatar registers the template avatar 10 to the 3D scan model 20 of the user through global rigid registration, skeleton-based pose registration, and local non-rigid registration.

Figure 11:
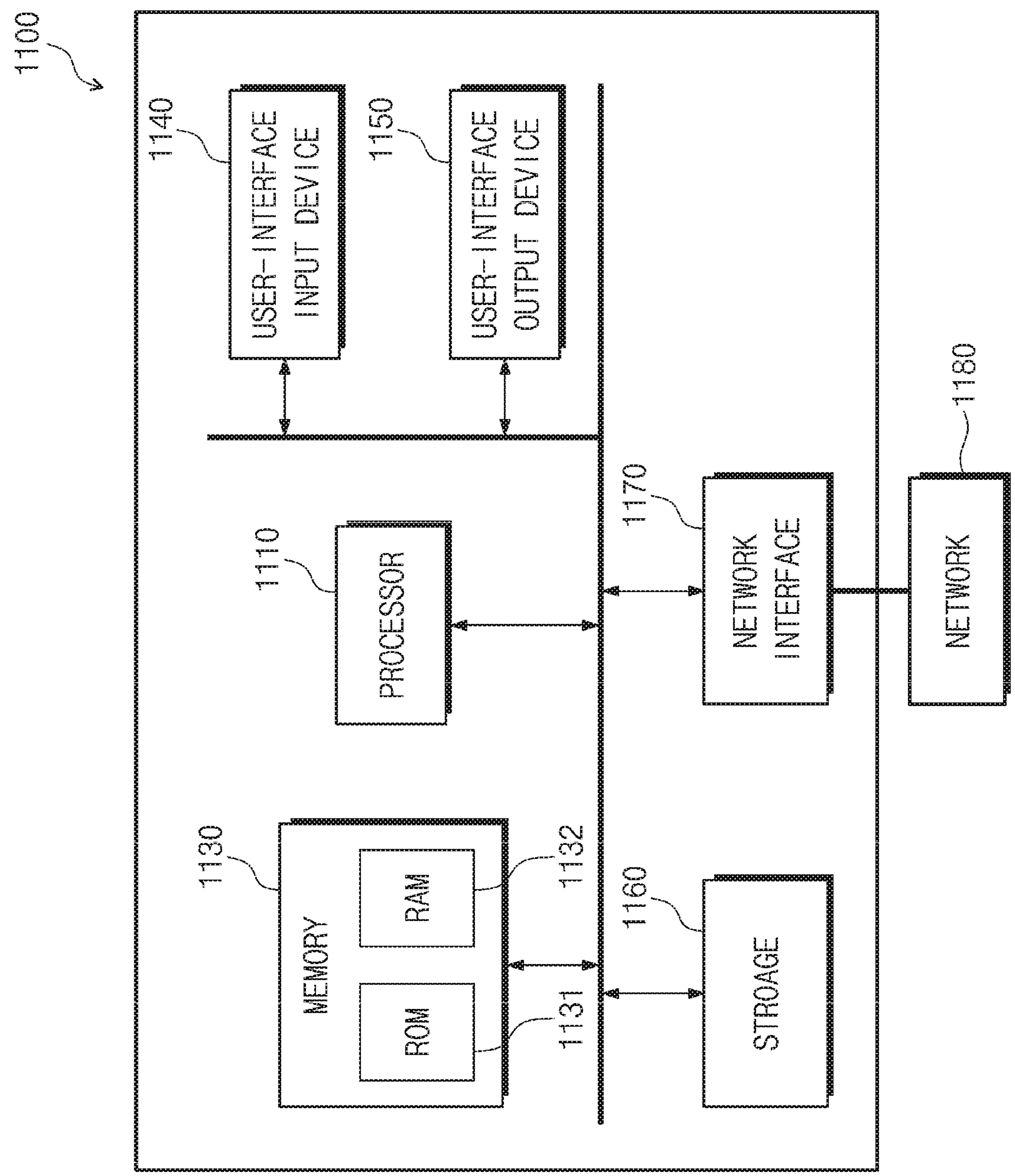
FIG. 11 is a view that shows a computer system according to an embodiment of the present invention.

FIG. 11 is a view that shows a computer system according to an embodiment of the present invention.

Referring to FIG. 11, the apparatus for generating a 3D avatar according to an embodiment of the present invention may be implemented in a computer system 1100 including a computer-readable recording medium. As shown in FIG. 11, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 that is connected with a network 1180. The processor 1110 may be a central processing unit or a semiconductor device for executing processing instructions stored in the memory 1130 or the storage 1160. The memory 1130 and the storage 1160 may be various types of volatile and nonvolatile storage media. For example, the memory may include ROM 1131 or RAM 1132.

Also, the one or more processors 1110 may run one or more programs.

Here, the one or more processors 1110 may include the 3D scan module 110, the model registration module 120, and the avatar generation module 130, and may perform the functions of the 3D scan module 110, the model registration module 120, and the avatar generation module 130 using the one or more programs.

The present invention secures the integrity and accuracy of the 3D body shape of a user, thereby generating a 3D avatar in which the body shape of the user is reflected.

Also, the present invention may generate an animatable 3D avatar in which the body shape of a user is reflected in spite of incompleteness of a 3D scan model.

Also, the present invention may enable consistent body shape information to be measured even when the pose of the body of a user is changed.

As described above, the apparatus and method for generating a 3D avatar according to the present invention are not limitedly applied to the configurations and operations of the above-described embodiments, but all or some of the embodiments may be selectively combined and configured, so that the embodiments may be modified in various ways.

What is claimed is:

1. A method for generating a 3D avatar, performed by an apparatus for generating the 3D avatar, comprising:

performing a 3D scan of a body of a user using an image sensor and generating a 3D scan model using a result of the 3D scan of the body of the user;

matching the 3D scan model and a previously stored template avatar; and generating a 3D avatar based on a result of matching the 3D scan model and the template avatar, wherein an extent of the matching is based upon whether translation, rotation, and scale of the template avatar is adjusted in advance to match the 3D scan model, wherein matching the 3D scan model and the previously stored template avatar is configured to match the 3D scan model and the template avatar using point-to-point correspondence between the 3D scan model and the template avatar, wherein the point-to-point correspondence includes information in which one or more positions predefined in body parts of the 3D scan model and the template avatar are defined as corresponding points, wherein matching the 3D scan model and the previously stored template avatar is configured to apply rigid transformation to the template avatar by moving and rotating the 3D scan model based on positions of the corresponding points of the template avatar and positions of the corresponding points of the 3D scan model using the point-to-point correspondence.

2. The method of claim 1, wherein the one or more positions predefined in the body parts include at least one of a position of a face, positions of hands, and positions of feet.

3. The method of claim 2, wherein matching the 3D scan model and the previously stored template avatar is configured to define the corresponding points of the 3D scan model and the corresponding points of the template avatar as pairs of corresponding points based on the one or more positions predefined in the body parts.

4. The method of claim 1, wherein matching the 3D scan model and the previously stored template avatar is configured to apply 6-degrees-of-freedom rigid transformation for calibrating translations, orientations and scales of the 3D scan model and the template avatar.

5. The method of claim 1, wherein matching the 3D scan model and the previously stored template avatar is configured to change a pose of the template avatar using the point-to-point correspondence and skeleton information of the template avatar such that the pose of the template avatar matches a pose of the 3D scan model.

6. The method of claim 5, wherein matching the 3D scan model and the previously stored template avatar is configured to register the template avatar to the 3D scan model in such a way that, in order to minimize differences between the positions of the corresponding points of the template avatar and those of the 3D scan model, minimum distances from the corresponding points of the template avatar, the pose of which is changed using the skeleton information, to the corresponding points of the 3D scan model are calculated, and the pose of the template avatar is changed based on the minimum distances between the corresponding points and a minimum distance from each of vertices of the template avatar to the 3D scan model.

7. The method of claim 6, wherein matching the 3D scan model and the previously stored template avatar is configured to calculate a minimum distance between a surface of the template avatar and a surface of the 3D scan model by adjusting a position of each of the vertices of the template avatar using an affine transformation matrix.

8. An apparatus for generating a 3D avatar, comprising:

one or more processors;

memory; and one or more programs, wherein: the one or more programs are stored in the memory and executed by the one or more processors, and the one or more processors are configured to perform a 3D scan of a body of a user using an image sensor and generate a 3D scan model using a result of the 3D scan of the body of the user, to match the 3D scan model and a previously stored template avatar, and to generate a 3D avatar based on a result of matching the 3D scan model and the template avatar by executing the one or more programs, and wherein an extent of the matching is based upon whether translation, rotation, and scale of the template avatar is adjusted in advance to match the 3D scan model, wherein the one or more processors match the 3D scan model and the template avatar using point-to-point correspondence between the 3D scan model and the template avatar, wherein the point-to-point correspondence includes information in which one or more positions predefined in body parts of the 3D scan model and the template avatar are defined as corresponding points, wherein the one or more processors apply rigid transformation to the template avatar by moving and rotating the 3D scan model based on positions of the corresponding points of the template avatar and positions of the corresponding points of the 3D scan model using the point-to-point correspondence.

9. The apparatus of claim 8, wherein the one or more positions predefined in the body parts include at least one of a position of a face, positions of hands, and positions of feet.

10. The apparatus of claim 9, wherein the one or more processors define the corresponding points of the 3D scan model and the corresponding points of the template avatar as pairs of corresponding points based on the one or more positions predefined in the body parts.

11. The apparatus of claim 8, wherein the one or more processors apply 6-degrees-of-freedom rigid transformation for calibrating translations, orientations and scales of the 3D scan model and the template avatar.

12. The apparatus of claim 8, wherein the one or more processors change a pose of the template avatar using the point-to-point correspondence and skeleton information of the template avatar such that the pose of the template avatar matches a pose of the 3D scan model.

13. The apparatus of claim 12, wherein the one or more processors register the template avatar to the 3D scan model in such a way that, in order to minimize differences between the positions of the corresponding points of the template avatar and those of the 3D scan model, minimum distances from the corresponding points of the template avatar, the pose of which is changed using the skeleton information, to the corresponding points of the 3D scan model are calculated, and the pose of the template avatar is changed based on the minimum distances between the corresponding points and a minimum distance from each of vertices of the template avatar to the 3D scan model.

14. The apparatus of claim 13, wherein the one or more processors calculate a minimum distance between a surface of the template avatar and a surface of the 3D scan model by adjusting a position of each of the vertices of the template avatar using an affine transformation matrix.

* * * * *